United States Patent
Vokinger et al.

(10) Patent No.: US 9,816,842 B2
(45) Date of Patent: Nov. 14, 2017

(54) OPTOELECTRONIC POSITION MEASURING DEVICE INCLUDING A CODE CARRIER, A RADIATION SOURCE, AND A DETECTION ELEMENT

(71) Applicant: HEXAGON TECHNOLOGY CENTER GMBH, Heerbrugg (CH)

(72) Inventors: Urs Vokinger, Au (CH); Werner Amann, Feldkirch (AT)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 49 days.

(21) Appl. No.: 14/383,482

(22) PCT Filed: Mar. 6, 2013

(86) PCT No.: PCT/EP2013/054480
§ 371 (c)(1),
(2) Date: Sep. 5, 2014

(87) PCT Pub. No.: WO2013/131945
PCT Pub. Date: Sep. 12, 2013

(65) Prior Publication Data
US 2015/0014520 A1    Jan. 15, 2015

(30) Foreign Application Priority Data

Mar. 9, 2012    (EP) .................................... 12158745

(51) Int. Cl.
*G01D 5/34*    (2006.01)
*G01D 5/347*    (2006.01)

(52) U.S. Cl.
CPC ............... *G01D 5/34* (2013.01); *G01D 5/347* (2013.01)

(58) Field of Classification Search
CPC .................................. G01D 5/34; G01D 5/347
(Continued)

(56) References Cited

U.S. PATENT DOCUMENTS 4,319,134 A    3/1982  Weber
4,389,902 A *  6/1983  Kataoka .................. G01F 1/075
                                                        250/231.14

(Continued)

FOREIGN PATENT DOCUMENTS

CH    658 514 A5    11/1986
CN    1369687 A    9/2002
(Continued)

OTHER PUBLICATIONS

European Search Report dated Feb. 6, 2013 as received in Application No. EP 12 15 8745.

*Primary Examiner* — Thanh Luu
(74) *Attorney, Agent, or Firm* — Maschoff Brennan (57) ABSTRACT

Embodiments described herein include an optoelectronic position measuring device that may include a code carrier, which carries an optically detectable position code, a radiation source for emitting optical radiation onto the code carrier, and a detection element having a multiplicity of light-sensitive reception regions for receiving at least part of the optical radiation, as a result of which a scanning signal dependent on the position code can be generated and a position of the code carrier relative to the detection element can thus be detected, wherein the measurement components are arranged in a fixed spatial relationship with respect to one another on a carrier element, the code carrier is movable with one degree of freedom, in particular rotationally or along an axis, and the code carrier and the carrier element are arranged at a fixed spatial distance with respect to one another.

19 Claims, 8 Drawing Sheets

(58) Field of Classification Search
USPC .................................. 250/231.13–231.18
See application file for complete search history.

(56) References Cited

U.S. PATENT DOCUMENTS

| | | | |
|---|---|---|---|
| 4,536,650 A * | 8/1985 | Carena .................. | G01D 5/347 250/231.14 |
| 4,668,862 A | 5/1987 | Waibel | |
| 5,266,797 A * | 11/1993 | Zuefferey .......... | G01D 5/34715 250/231.14 |
| 6,605,828 B1 | 8/2003 | Schwarzrock et al. | |
| 7,057,159 B2 | 6/2006 | Omi | |
| 7,102,123 B2 | 9/2006 | Chin et al. | |
| 7,185,444 B2 | 3/2007 | Falkinger et al. | |
| 8,127,993 B2 | 3/2012 | Yaku et al. | |
| 2003/0193015 A1* | 10/2003 | Chong .................. | G01D 5/347 250/231.13 |
| 2004/0173737 A1* | 9/2004 | Shimomura ............. | G01D 5/00 250/231.13 |
| 2005/0087681 A1* | 4/2005 | Chin .................. | G01D 5/34715 250/231.13 |

FOREIGN PATENT DOCUMENTS

| | | |
|---|---|---|
| CN | 1576780 A | 2/2005 |
| CN | 1661454 A | 8/2005 |
| CN | 101484780 A | 7/2009 |
| CN | 102072740 A | 5/2011 |
| DE | 198 54 733 A1 | 5/2000 |
| DE | 10 2006 024 179 A1 | 1/2007 |
| WO | 2010/072498 A1 | 7/2010 |

\* cited by examiner

OPTOELECTRONIC POSITION MEASURING DEVICE INCLUDING A CODE CARRIER, A RADIATION SOURCE, AND A DETECTION ELEMENT

FIELD OF THE INVENTION

The invention relates to an optoelectronic position measuring apparatus for determining directions, angles, and/or lengths by means of an illumination device, a code element, and a detector.

BACKGROUND

The determination of directions, angles, and lengths as positions is required in many fields of application, for example, in geodetic and industrial surveying. Developments in angle measuring technology have led via mechanical readout procedures up to fully automated angle measurement according to the current prior art.

Known automated position measuring apparatuses generally comprise a code carrier and a scanning device. In angle measuring devices, the code carrier is typically implemented as rotatable about an axis relative to the scanning device, wherein then an angle position of the code carrier represents the variable to be measured. The code carrier can have, for example, an indexing or coding for position determination, wherein the coding can be applied to a surface or lateral surface of the code carrier.

To automatically detect the position, the code carrier, which is movable relative to the scanning device, is scanned by means of various technologies. The known scanning methods include electronic-magnetic, electronic, and optical-electronic methods. The following statements relate to optical-electronic scanning methods and scanning devices, which have in particular an illumination device and a corresponding detector.

Typical optoelectronic angle sensors for determining a rotational angle about an axis have a code carrier and an optical detector, which are rotatable relative to one another. The optical detector is, for example, a photodetector, a CCD line array, or a CCD surface array. The code carrier is generally implemented as a circular disc or circular ring, and carries an optically detectable position code along the circumference thereof, of which a section is imaged by an illumination device on the detector. In general, the code carrier of the angle sensor rotates. However, it is also possible to implement the code carrier as stationary and the detector as rotating.

To determine angular positions from 0° to 360°, the coding is typically arranged in a full circle. The angle resolution of the full circle is determined according to the type of coding and according to the scanning device used for reading the coding. Thus, for example, by applying a code in a plurality of tracks or by finer indexing, the angle resolution is increased, wherein the achievable resolution is restricted for reasons of manufacturing and costs. For example, arrangements of one or more detectors are known for reading the code, CCD line arrays or CCD surface arrays can represent such detectors, for example. The code can be implemented by structuring a reflective surface or also a translucent material, so that the imaging is performed in transmission, reflection, or a combined method.

The Swiss patent specification CH 658514 A5 discloses such an apparatus for measuring an angle position. A mark, the position of which in relation to a surface of sensors represents the variable to be measured, is imaged on this surface. The output signals of the sensors are led into an analysis circuit, which sequentially determines the distribution of the intensity of the signals generated by the sensors. The position of the mark in relation to the surface of sensors can be derived from the intensity distribution.

The dimensions of a position measuring apparatus for geodetic devices are advantageously to be kept small. To permit a corresponding small and less cumbersome construction, the illumination device and the detector of the position measuring apparatus have for some time been arranged on a shared electrically powered printed circuit board, and not, as beforehand, above and below a code carrier respectively on a separate electrically powered printed circuit board. In the case of position measuring apparatuses of the prior art, having an arrangement of the detector and the illumination device located adjacent to one another, the emitted beams are deflected by a deflection element having two planar, reflective surfaces, for example, such that an image of the code is generated on the detector by the code carrier, which is arranged downstream in the beam path. The emitted beams can optionally be collimated by means of an optic arranged directly downstream from the illumination source.

Since a code carrier is to be guided as closely as possible over the detector, the most planar and smooth surface is an essential mechanical requirement. In addition, high-precision lateral positioning of source and receiver must be performed.

The positioning of the chips in the component housings can be scattered significantly by manufacturing tolerances, so that an exact position of the chips itself cannot be insured by the positioning of the overall component. These problems relate in particular to the beam source.

Placing the beam source and the detector adjacent to one another on the same plate allows a calibration of sensor and source with the aid of a microscope. Both components conventionally have different structural heights. Thus, the radiation source normally has a greater depth than the detection element.

SUMMARY

Some embodiments of the present invention provide an improved optoelectronic position measuring apparatus having more compact dimensions.

Some embodiments of the present invention provide an optoelectronic position measuring apparatus having a reduced distance between a code carrier and a carrier plate, which has a detection element.

Some embodiments of the present invention provide an optoelectronic position measuring apparatus having more precise positioning of the beam source and the detection element.

An optoelectronic position measuring apparatus according to the invention comprises a code carrier having a position code and a carrier element, in particular a printed circuit board, having a radiation source, in particular an LED or a laser diode, and a detection element, in particular a sensor array or a CCD chip. The radiation source and/or the detection element are arranged according to the invention wholly or partially countersunk in the carrier element, so that either they do not overhang at all or—compared to a known superimposed arrangement—they only overhang to a reduced extent over a plane defined by the front side of the carrier element facing the code disc. At least the taller of the two components radiation source and detection element— typically the radiation source—is wholly or partially countersunk in the carrier element.

By way of a bare construction of the chip without housing, a high-precision calibration can advantageously be performed, which is necessary for implementing smaller distances. In particular, an embodiment in a manner free of covering glass is advantageously also implementable. The optical elements can also be provided with a copper layer, so that they can be soldered like electronic components onto conductor paths or pads of the carrier element.

Preferably, the radiation source is completely countersunk in the carrier element. The definition of the mechanical surface by the detector is thus additionally ensured.

In an advantageous embodiment, a printed circuit board is provided as a carrier element for this purpose on the side facing away from the code disc with a pocket hole, into which an LED or a laser diode—with or without housing—is introduced as a radiation source. An opening can be configured as an aperture on the front side of the printed circuit board. In particular, the remaining material part between the pocket hole and the side of the printed circuit board facing the code disc can be drilled through, whereby an aperture effect is achieved. If the material part which lies in this opening is excessively thin and therefore translucent, it can be made opaque—for example, by means of a copper layer, similar to a solder spot.

In a further advantageous embodiment, a depression is introduced into the printed circuit board on the side facing the carrier, into which depression the radiation source can be introduced and precisely positioned—in particular as a "bare" chip without housing.

A detector is preferably also arranged countersunk as a detection element, in particular in a depression introduced on the side of the printed circuit board facing the code carrier, so that a planar level arises on the side of the printed circuit board facing the code carrier, over which the code carrier is moved.

If further elements are to be housed on the printed circuit board in addition to the radiation source and the detection element, the superficial arrangement of which would obstruct an approach of the code element, these elements can also be arranged entirely or partially countersunk, of course.

Preferably, the elements arranged countersunk in the depression are electrically contacted with the rear side of the carrier element by connection contact holes ("via holes") embedded with optical adhesive. In particular, aperture structures or lens structures can be integrated in the optical adhesive. In particular if the carrier element is assembled from a plurality of layers of printed circuit boards, contacting can alternatively also be performed via, conductor paths of one of the printed circuit boards.

If the element is countersunk on the side facing the code carrier, the depression can be filled with an optical adhesive to protect the terminals. Optionally, the surface of the filling adhesive can be moulded into an optically diffractive or refractive surface. Alternatively, after the filling with optical adhesive, the surface of the carrier element can also be polished, so that a defined smooth mechanical surface arises with inclusion of the filled depression.

However, filling the depression is not absolutely necessary. In particular in the case in which the end side of the countersunk component, for example, a CCD chip, is coincident with the front side of the carrier element, a filling adhesive can also be omitted entirely. Optical components such as lenses can also be introduced into the depression, which are fastened in the printed circuit board or on the countersunk component itself—for example, via a click mechanism and can completely cover the depression. In particular, this cover can also form a substantially planar surface jointly with the front side of the printed circuit board.

A printed circuit board for countersinking the components can advantageously consist of a plurality of layers, which are adhesively bonded together in particular. The depressions and openings are provided before or after the adhesive bonding together, in particular by milling them out. Because excess adhesive could flow into the depressions by way of the compression pressure during or after the adhesive bonding together, adhesive traps are advantageously provided in the depressions, into which this adhesive could flow, whereby the base area of the depression remains free of adhesive.

The front side of the carrier element is considered to be the side of the carrier element facing the code carrier—this is preferably a planar surface.

The code carrier can be implemented according to all shapes known according to the prior art and from materials known to a person skilled in the art, for example, plastic. In particular, it has a shape having circular cross section, for example, the shape of a circular disc, a ring, a cylinder, or a hollow cylinder. The code carrier can also be implemented as a circular segment. The code carrier can have reflector elements, and can be entirely or partially light-transmissive.

As is known from the prior art, in particular sensor arrays, for example, photodiodes, CCD or CMOS sensors arrayed in a line, or also surface sensors having photodiodes arranged in a planar manner, CCD, CMOS, or PSD sensors can be used as detectors. A use of detector or scanning films, in particular with organic photodetectors, for example, photodiodes, and organic transistors is also possible.

One field of use for position measuring apparatuses according to the invention is geodetic measuring instruments having the function of direction and angle determination. Thus, for example, theodolites having horizontal and vertical pitch circle and corresponding read-out devices are equipped to be able to measure horizontal and vertical angles with ultrahigh precision. Position measuring apparatuses are also used in measuring machines of all types, for example, coordinate measuring machines having jointed arms.

BRIEF DESCRIPTION OF THE DRAWINGS

The position measuring apparatus according to the invention is described hereafter on the basis of embodiments, which are schematically shown solely as examples. Further advantages and characteristics of the invention are apparent from the following description of presently preferred embodiments in conjunction with the appended figures. In the schematic figures.

DETAILED DESCRIPTION

Figure 1A:
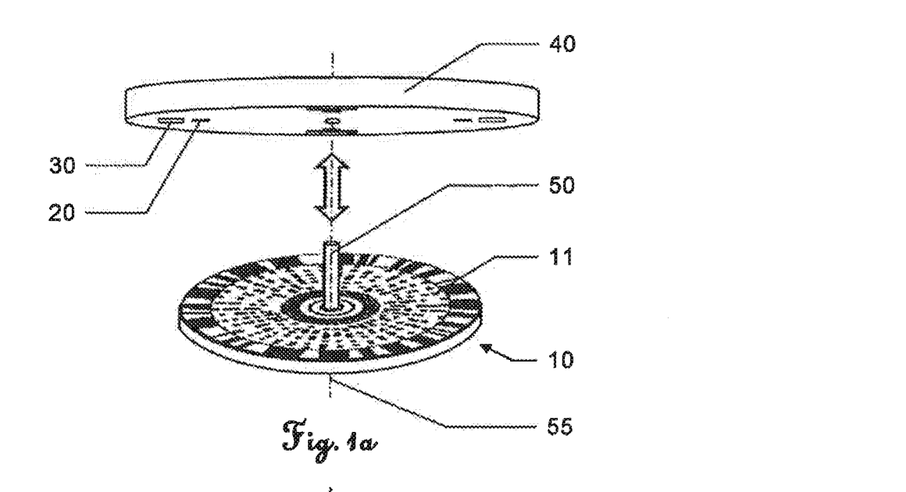
FIG. 1a shows components of a position measuring apparatus according to the invention.
Figure 1B:
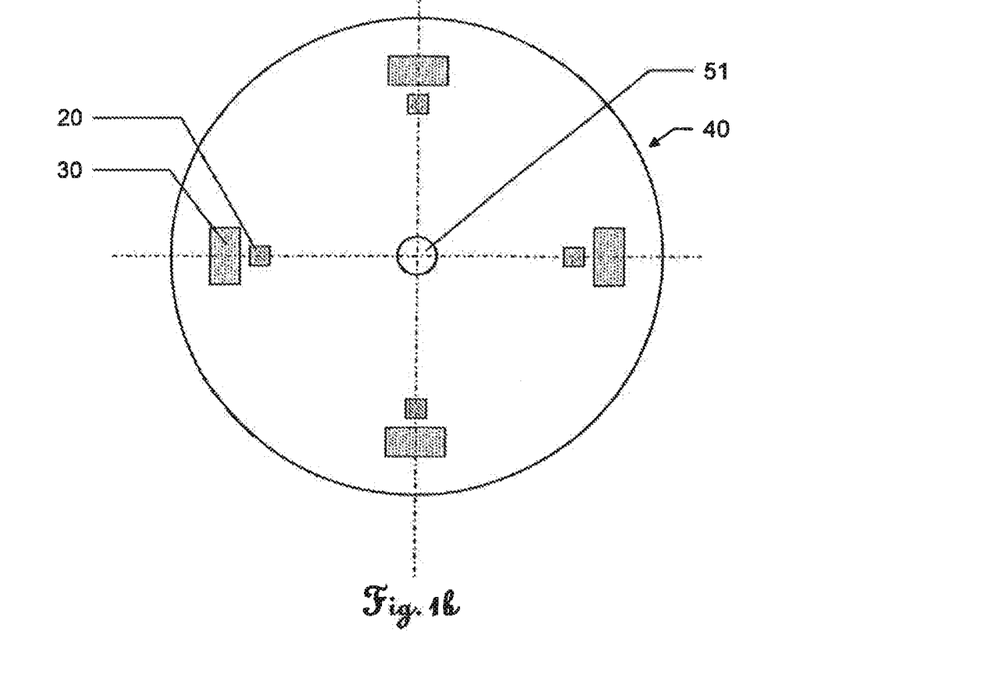
FIG. 1b shows a carrier element of a position measuring apparatus according to the invention in a top view.
Figure 1C:
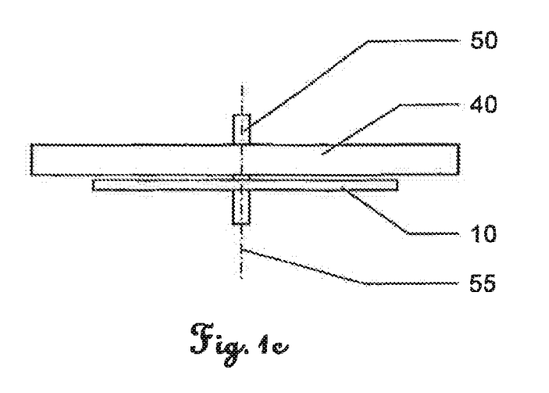
FIG. 1c shows a position measuring apparatus according to the invention in a side view.

FIGS. 1a to 1c show an exemplary construction of an optoelectronic position measuring apparatus according to the invention. FIG. 1a shows the code carrier 10 and the carrier element 40 for accommodating the optoelectronic components. For a better overview, the two components are shown in the uninstalled state. The carrier element 40 has on its front side facing the code carrier four optoelectronic measuring component pairs, respectively consisting of a radiation source 20 and a detection element 30. The code carrier 10 is configured as a circular disc and is provided on the front side essentially over the entire area with a position code 11. An axle element 50 extends along the axis of rotation 55 and allows in the installed state a rotation of the code element 10 about the axis of rotation 55 relative to the carrier element 40.

FIG. 1b shows the front side of the carrier element 40 from FIG. 1a with the four optoelectronic measuring component pairs in a top view. The carrier element 40 has in the middle an opening 51 for accommodating the axle element 50.

FIG. 1c shows the optoelectronic position measuring apparatus from FIG. 1a in the assembled state in a side view. The code carrier 10 is arranged parallel and at the least possible distance to the carrier element 40 and so it is rotatable about the axis of rotation 55.

Figure 2A:
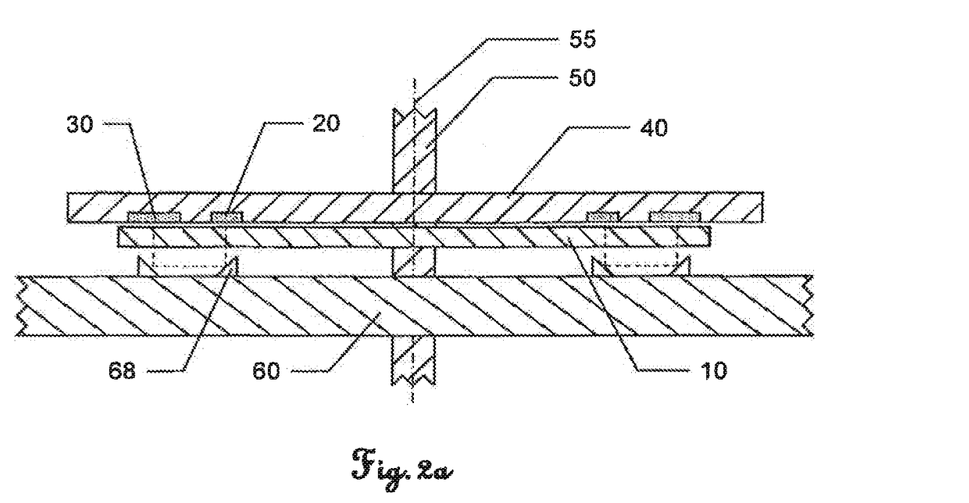
FIG. 2a shows a first embodiment of a position measuring apparatus according to the invention having deflection mirrors.
Figure 2B:
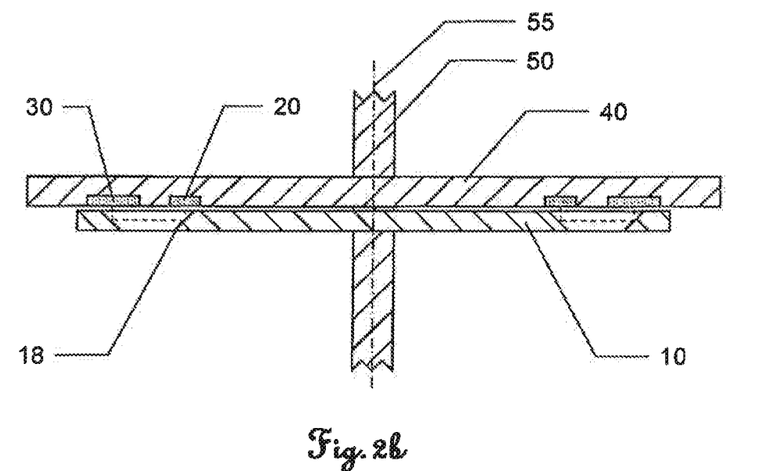
FIG. 2b shows a second embodiment of a position measuring apparatus according to the invention having a beam deflection in the code carrier.
Figure 2C:
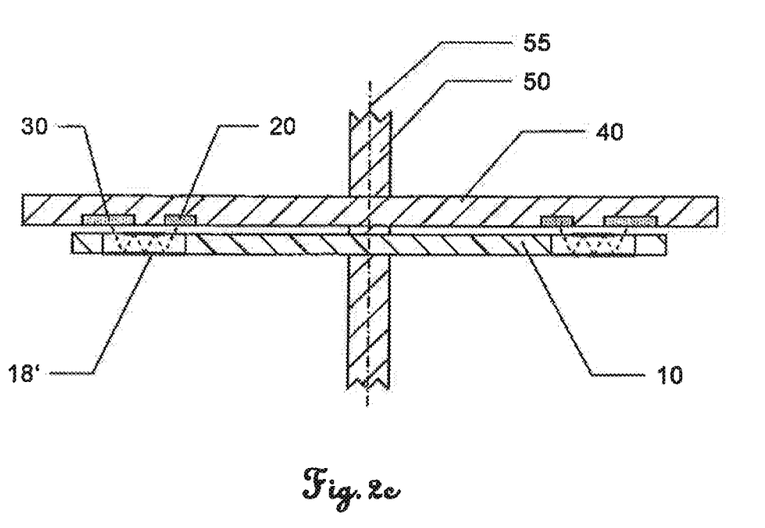
FIG. 2c shows a third embodiment of a position measuring apparatus according to the invention having a code carrier implemented as an optical waveguide.

In FIGS. 2a-c, three different exemplary embodiments of the optoelectronic position measuring apparatuses shown in FIGS. 1a to 1c are shown. FIG. 2a shows an exemplary embodiment of an optoelectronic position measuring apparatus in a cross section. A code carrier 10 is fastened on an axle element 50 so it is rotatable about the axis of rotation 55. A carrier element 40, which has a plurality of measuring component pairs, consisting of radiation source 20 and detection element 30, is arranged parallel to the code carrier 10. On the side of the code carrier 10 opposite to the carrier element 40, a mirror carrier element 60, which is in a fixed spatial relationship to the carrier element 40, is located. Deflection mirror elements 68 are fitted on the mirror carrier element 60 opposite to the measuring component pairs of the carrier element 40. The code carrier 10 is at least partially transmissive for the radiation emitted by the radiation source 20. This radiation is incident on the deflection mirror element 68 after traversing the code carrier 10 and is deflected in the direction of the detection element 30.

In the embodiment shown in FIG. 2b, the mirror carrier element 60 is omitted in relation to that shown in FIG. 2a. Instead, beam deflection means 18 in the form of deflection mirrors, which deflects the radiation emitted by the radiation source in the direction of the detection element 30, are integrated in the code carrier 10.

In the embodiment shown in FIG. 2c, in contrast to that shown in FIG. 2b, the beam deflection means 18' integrated in the code carrier 10 functions like an optical waveguide. By reflections on the interior of the code carrier 10, the light is conducted through the at least partially radiation-transmissive code carrier 10 and finally directed onto the detection element 30. Alternatively, the radiation can be diffractively coupled into and decoupled out of a waveguide.

Figure 3A:
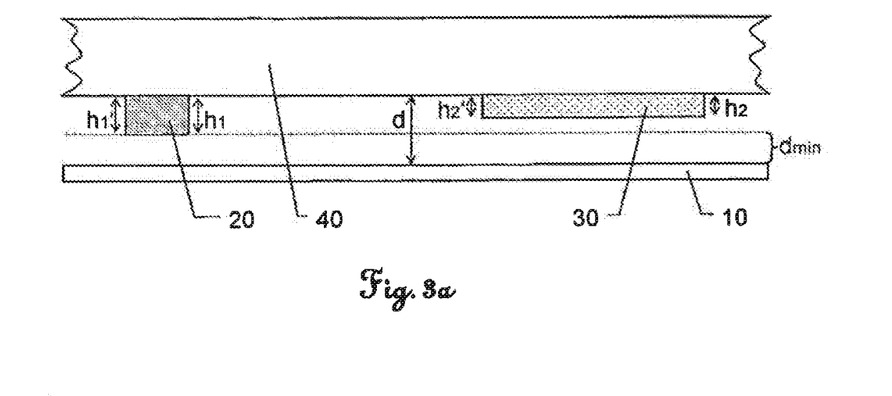
FIG. 3a shows an arrangement of code carrier and carrier element with measuring components placed on the carrier element.
Figure 3B:
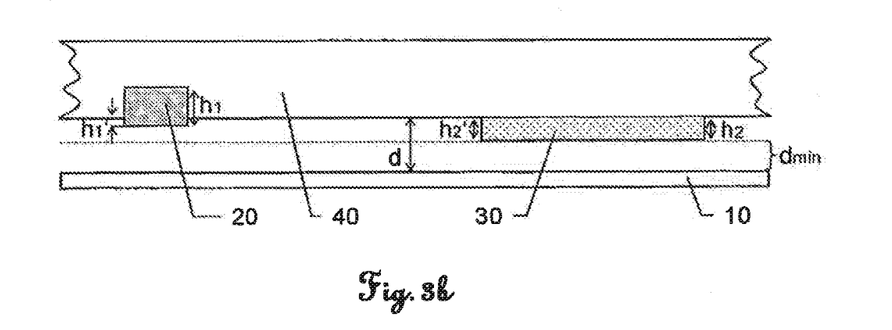
FIG. 3b shows an arrangement according to the invention of code carrier and carrier element with measuring components partially countersunk in the carrier element and reduced distance.
Figure 3C:
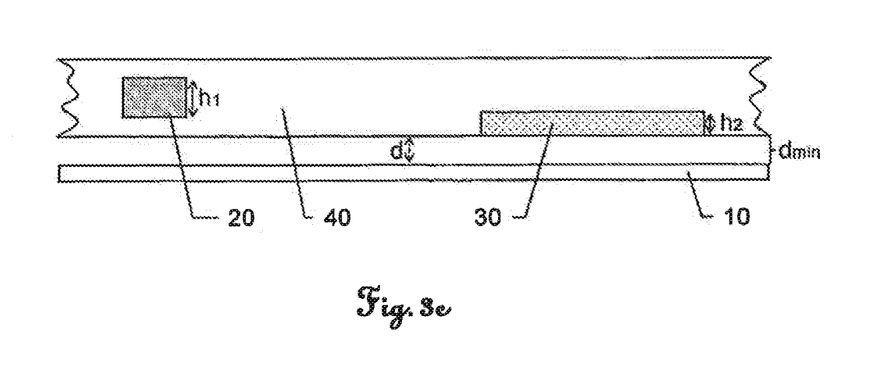
FIG. 3c shows an arrangement according to the invention of code carrier and carrier element with measuring components completely countersunk in the carrier element and minimized distance.

The principle of reducing the distance d between the code carrier 10 and the carrier element 40 by countersinking according to the invention measuring components 20, 30 into the carrier element is illustrated by FIGS. 3a-c.

FIG. 3a shows in cross section a detail of a position measuring apparatus with a code carrier 10 and a carrier element 40. A radiation source 20 and a detection element 30 are placed on the carrier element 40 as measuring components, wherein the two measuring components have different heights $h_1$, $h_2$. Since radiation source 20 and detection element 30 are placed on the surface of the carrier element 40, their overhangs $h_1'$, $h_2'$ over the surface of the carrier element 40 are equal to their respective heights $h_1$, $h_2$.

The overhangs $h_1'$, $h_2'$ are defined by the positions of the end sides of the measuring components on an imaginary coordinate axis (not illustrated) relative to the front side of the carrier element 40, said front side facing the code carrier 10. Said coordinate axis runs in that direction in which the code carrier 10 follows the carrier element 40 (that is to say vertically from top to bottom in this illustration), wherein the front side of the carrier element 40 represents the zero point of the coordinate axis. Therefore, if the end side lies between the front side and the code carrier 10, the coordinate indicating the position (i.e. the respective overhang $h_1'$, $h_2'$, has a positive value; if the end side lies exactly on the front side, for example in a manner coplanar with respect thereto, the value of said coordinate or of the overhang $h_1'$, $h_2'$ is equal to zero; and if the end side, as viewed from the code carrier 10, lies behind the front side of the carrier element 40, the coordinate or the respective overhang $h_1'$, $h_2'$ has a negative value.

The surface of the front side of the carrier element 40 facing the code carrier 10 is shown here by a straight line. The front side is preferably a substantially planar surface, but not necessarily. The surface of the front side can also be uneven, for example, wavy or stepped, and can have protrusions, depressions, and holes. In the case of such an uneven surface, the front side is defined as a planar surface by the point of the shortest distance to the code carrier.

A functional minimum distance $d_{min}$ is also shown, which is represented by a dotted line. In practice, it is caused by the mode of operation of an optoelectronic position measuring apparatus according to the invention and is typically necessary—depending on manufacturing tolerances, selected materials, temperature variations, and further factors—for interference-free operation of the apparatus. Theoretically, the functional minimum distance $d_{min}$ can also approach zero, because of which embodiments having a negligibly small functional minimum distance $d_{min}$ are also conceivable.

The minimum distance d between the code carrier 10 and the carrier element 40 is caused, on the one hand, by the functional minimum distance $d_{min}$ and, on the other hand, by the overhangs $h_1'$, $h_2'$ of the measuring components 20, 30. The distance d can never be less than the functional minimum distance $d_{min}$,
the sum of the functional minimum distance $d_{min}$ and the overhang $h_1'$ of the radiation source 20, and/or
the sum of the functional minimum distance $d_{min}$ and the overhang $h_2'$ of the detection element 30.

The following must therefore apply for d:

$$d \geq d_{min}$$

$$d \geq d_{min} + h_1'$$

$$d \geq d_{min} + h_2'$$

Since the functional minimum distance $d_{min}$ can also approach zero, the distance d must be equal than or greater to the overhangs $h_1'$, $h_2'$ of the measuring components 20, 30 in any case.

The taller of the two measuring components placed on the surface of the carrier element 40—in this illustration the radiation source 20—forms the tallest protrusion on the carrier element 40; the possible lower limit for the distance d is therefore equal here to the sum of the overhang $h_1'$ and the functional minimum distance $d_{min}$. To reduce the distance d beyond the instantaneously given lower limit, it is thus necessary here to reduce the overhang $h_1'$ of the radiation source 20. Up to a certain degree, this can be achieved by reducing the height $h_1$ of the radiation source 20, for example, by a change in its construction. However, the countersinking according to the invention of the radiation source 20 in the carrier element 40 is less complex and significantly more effective.

In FIG. 3b, the radiation source 20 is partially countersunk in the carrier element 40 according to the invention. The overhang $h_1'$ of the radiation source 20 is reduced enough that the overhang $h_2'$ of the detection element 30 is now greater. The distance d is now caused by the sum of the overhang $h_2'$ and the functional minimum distance $d_{min}$ and can result as less than that shown in FIG. 3a. Since the smallest possible distance d is sought, in this illustration, the code carrier 10 is shifted closer to the carrier element 40.

In FIG. 3c, the radiation source 20 and the detection element 30 are completely countersunk in the carrier element 40—the end side of the radiation source 20 lies on a plane behind the front side of the carrier element 40, the end side of the detection element 30 lies precisely on the plane of the front side. There are no overhangs $h_1'$, $h_2'$, which are relevant for a determination of the minimum distance d, since the overhang $h_1'$ of the radiation source 20 is negative, and the overhang $h_2'$ of the detection element 30 is equal to zero. The smallest possible distance d therefore corresponds here to the functional minimum distance $d_{min}$ and is thus minimized.

Various exemplary embodiments are described hereafter, in which according to the invention a measuring component is arranged countersunk in a printed circuit board.

Figure 4A:
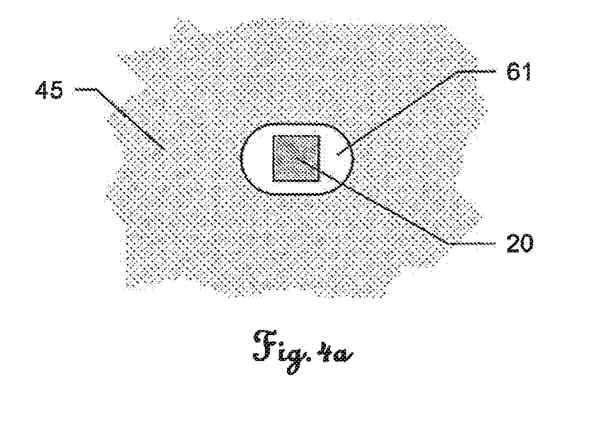
FIG. 4a shows an arrangement according to the invention of a radiation source in a pocket hole of a printed circuit board in a top view.
Figure 4B:
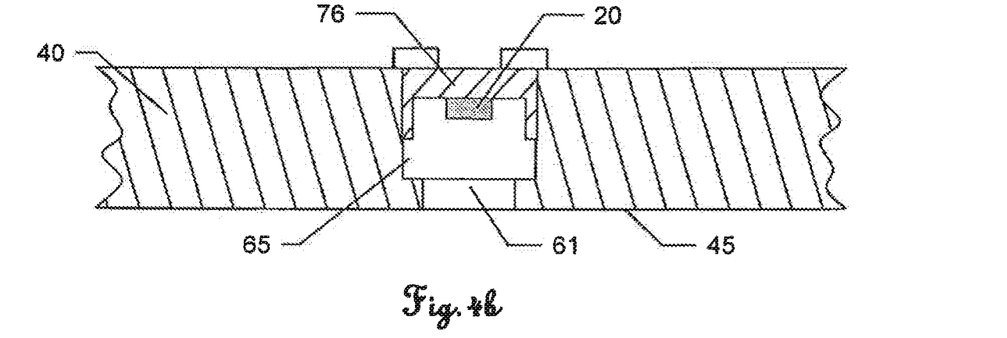
FIG. 4b shows the arrangement from FIG. 4a in a cross section.
Figure 4C:
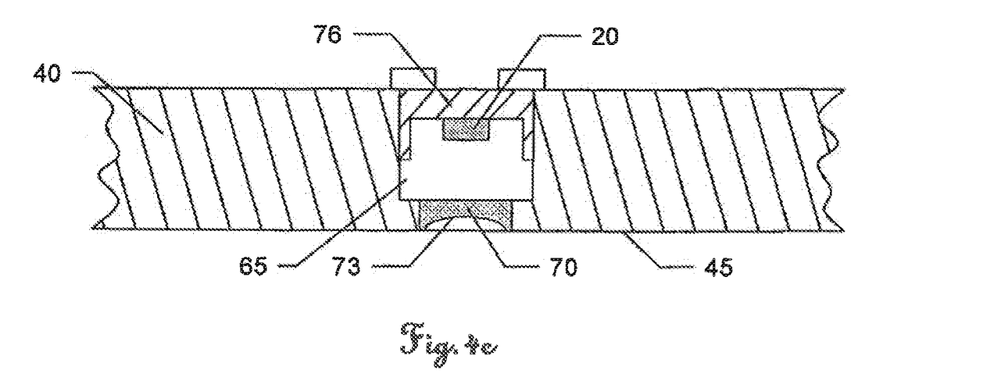
FIG. 4c shows an alternative arrangement to FIG. 4h.

In FIGS. 4a-c, a printed circuit board 40 having a depression 65 like a pocket hole for accommodating a radiation source 20, for example, an LED chip is shown. FIG. 4a shows a top view of the front side 45 (the side facing the code carrier 10) of the printed circuit board. An opening 61 on the front side 45 is used as an aperture for the measuring radiation emitted from the radiation source 20 located behind it.

FIG. 4b shows the arrangement shown in FIG. 4a in a cross section. The printed circuit board 40 has on its rear side (the side facing away from the code carrier 10) a depression 65 in the form of a pocket hole, which can be produced in particular by milling. A holding element 76 with a radiation source 20, for example, in the form of an LED chip with or without housing, is introduced into the depression 65. The holding element 76 is fastened on the printed circuit board 40 and doses the depression 65 toward the rear side. An opening 61 connects the depression 65 to the front side 45 of the printed circuit board 40. This opening 61 can be a borehole in particular and is used as an aperture for the radiation emitted from the radiation source 20.

If the remaining wall between pocket hole and front side 45 is excessively thin and therefore translucent, it can be made opaque to the measuring radiation emitted from the radiation source 20, for example, using a copper layer, similar to a solder spot.

FIG. 4c shows an alternative embodiment of the arrangement shown in FIG. 4b. The opening 61 is partially filled with a filling adhesive 70. The filling adhesive 70 has a diffractive or refractive surface 73 toward the front side 45 of the printed circuit board 40.

In further alternative embodiments, an optical—refractive or diffractive—element (not shown) can be placed in the opening 61. It can be provided on the outer edge with a copper layer, so that the element can be soldered in or on the opening. Coupling elements for a glass fibre can also be installed or the glass fibre cannot also be adhesively bonded directly in the opening.

Figure 5A:
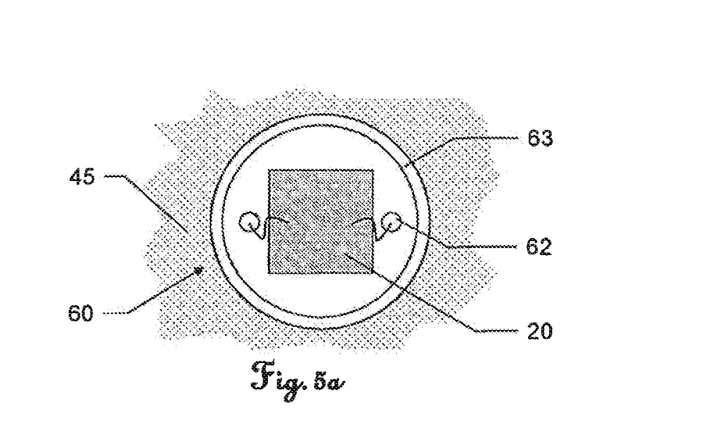
FIG. 5a shows an arrangement according to the invention of a radiation source in a depression of a printed circuit board in a top view.
Figure 5B:
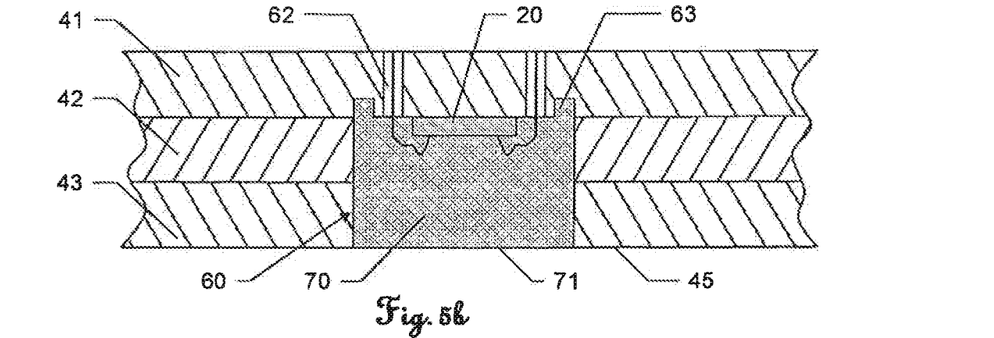
FIG. 5b shows the arrangement from FIG. 5a in a cross section.
Figure 5C:
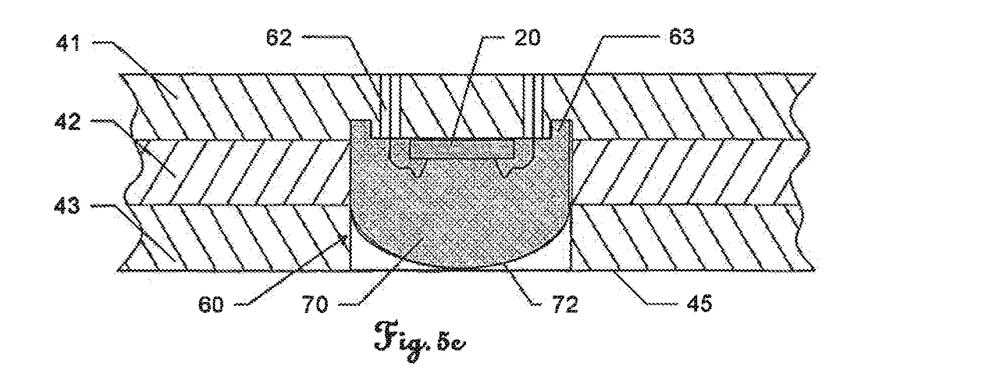
FIG. 5c shows an alternative arrangement to FIG. 5b.

FIGS. 5a-c show a printed circuit board, which is assembled from a plurality of layers 41-43, with a filled depression 60 for accommodating a radiation source 20. FIG. 5a shows a top view of the front side 45 of the printed circuit board. A radiation source 20 is installed in the round depression 60. Terminals lead to the radiation source 20 through two via holes 62, which lead to the rear side of the printed circuit board. Alternatively, the radiation source 20 can also be contacted via conductor paths (not shown) with one of the layers, for example, the printed circuit board layer 41. The depression 60, which is produced in particular by milling, has an adhesive trap 63 on its outer edge.

FIG. 5b shows the arrangement shown in FIG. 5a in a cross section. The printed circuit board consists of three layers 41-43, which are adhesively bonded to one another in particular. The depression 60 is filled with a filling adhesive 70. The surface 71 of the filling adhesive 70 terminates flush with the surface 45 of the printed circuit board.

The adhesive trap 63 is embodied as a groove at the edge of the depression 60 and is milled together with the depression 60 into the printed circuit board. The adhesive trap 63 is used during the installation for accommodating excess adhesive, which can possibly exit from the adhesive surfaces between the layers 41-43 into the depression 60 when the individual layers 41-43 are pressed together and/or after the milling out of the depression 60. The floor of the depression 60, on which the radiation source 20 is installed, thus remains free of adhesive.

FIG. 5c shows an alternative embodiment of the arrangement shown in FIG. 5b. The depression 60 is not completely filled, and the filling adhesive 70 has a diffractive or refractive surface 72.

Figure 6A:
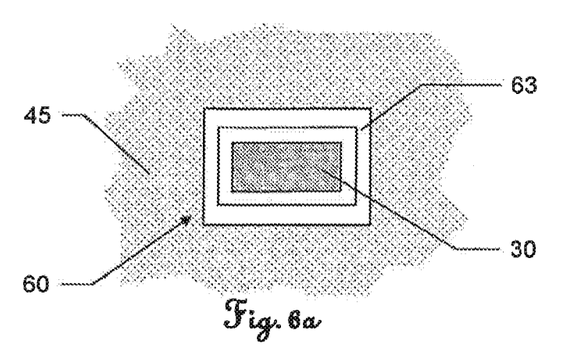
FIG. 6a shows an arrangement according to the invention of a detection element in a depression of a printed circuit board in a top view.
Figure 6B:
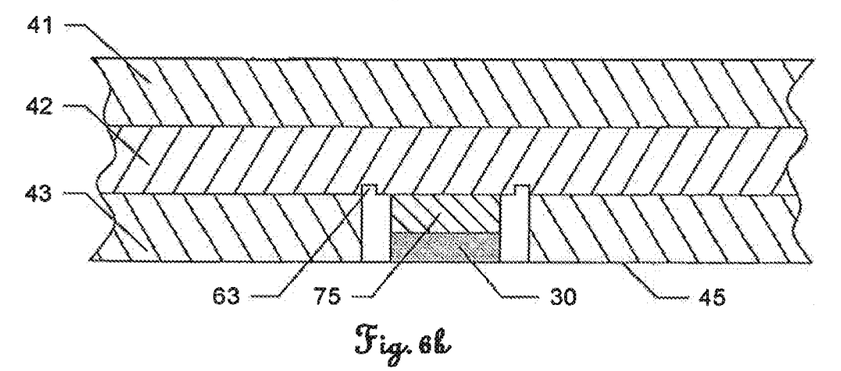
FIG. 6b shows the arrangement from FIG. 6a in a cross section.
Figure 6C:
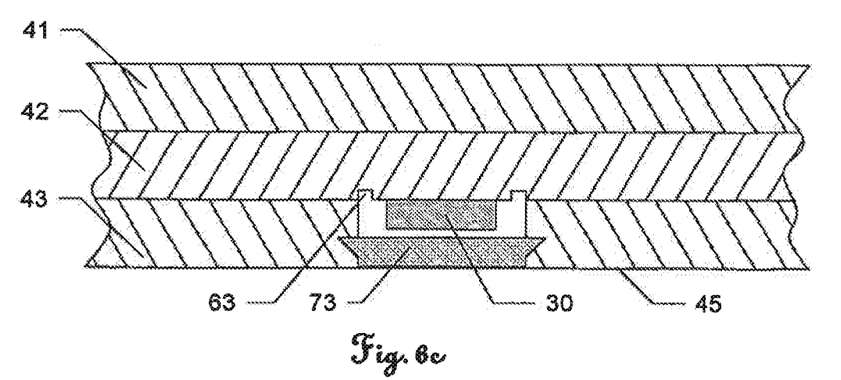
FIG. 6c shows an alternative arrangement to FIG. 6b.

FIGS. 6a-c show a printed circuit board assembled from a plurality of layers 41-43 with a depression 60 for accommodating a detection element 30. FIG. 6a shows a top view of the front side 45 of the printed circuit board. A detection element 30 is installed in the rectangular depression 60. The depression 60, which is produced in particular by milling, has an adhesive trap 63 on its edges.

FIG. 6b shows the arrangement shown in FIG. 6a in a cross section. The printed circuit board consists of three layers 41-43, which are adhesively bonded with one another in particular. The detection element 30 is arranged in the depression such that its surface lies in a shared plane with the surface 45 of the printed circuit board. For this purpose, the detection element 30 is arranged on an adapter 75.

FIG. 6c shows an alternative embodiment of the arrangement shown in FIG. 6b. The detection element 30 is arranged on the floor of the depression, and an optical element 73 is fitted on the opening of the depression such that the surface of the optical element 73 terminates flush with the surface 45 of the printed circuit board.

Figure 7A:
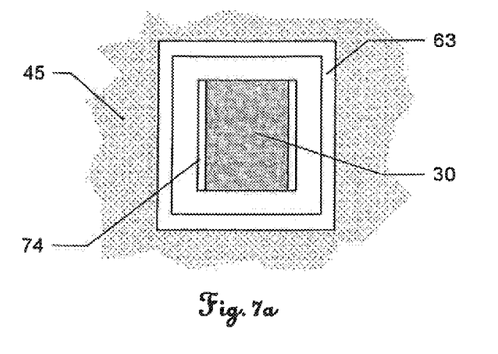
FIG. 7a shows an arrangement according to the invention of a detection element in a depression of a printed circuit board in a top view.
Figure 7B:
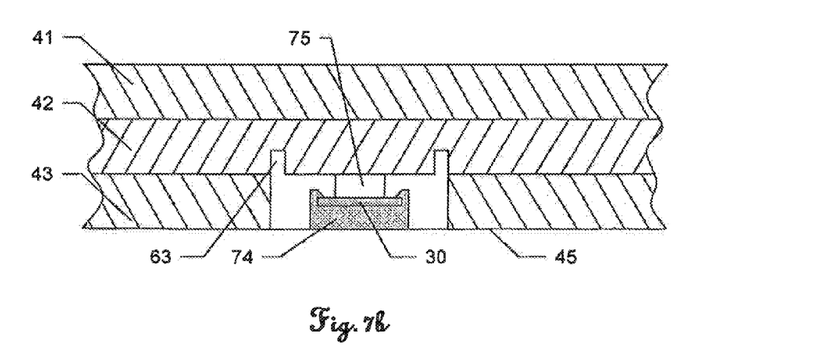
FIG. 7b shows the arrangement from FIG. 7a in a cross section.

FIGS. 7a-b show a printed circuit board assembled from a plurality of layers 41-43 with a depression 60 for accommodating a detection element 30. FIG. 7a shows a top view of the front side 45 of the printed circuit board. A detection element 30 with a plugged-on optical element 74 is installed in the rectangular depression 60. The depression 60, which is produced by milling in particular, has an adhesive trap 63 on its edges.

FIG. 7b shows the arrangement shown in FIG. 7a in a cross section. The printed circuit board also consists of three layers 41-43 here. The detection element 30 is arranged on an adapter 75. A plugged-on optical element 74 is fastened on the detection element 30. The surface of the optical element 74 is in a shared plane with the surface 45 of the printed circuit board.

It is obvious that these illustrated figures only schematically illustrate possible exemplary embodiments. The various approaches can also be combined with one another and with methods and devices of the prior art.

What is claimed is:

1. An optoelectronic position measuring apparatus, comprising
    a code carrier, which carries an optically detectable position code,
    a radiation source for emitting optical radiation onto the code carrier and
    a detection element having a multiplicity of light-sensitive receiving regions for receiving at least part of the optical radiation, as a result of which a scanning signal dependent on the position code can be generated and a position of the code carrier relative to the detection element can thus be detected, wherein
        the measuring components radiation source and detection element are arranged on a carrier element in a fixed spatial relationship with respect to one another and in each case with an end side facing the code carrier, in each case have a height between the end side and a base, and in each case have an overhang between the end side and a front side of the carrier element, said front side facing the code carrier,
        the carrier element is a printed circuit board,
        the code carrier is arranged parallel to the front side of the carrier element, directly opposite to the radiation source and to the detection element, and movable with one degree of freedom, and
        the code carrier and the carrier element are arranged at a fixed spatial distance with respect to one another, the distance being at least of the same magnitude as the overhang of the radiation source, and being at least of the same magnitude as the overhang of the detection element,
    wherein at least that measuring component having the greater height is arranged on a plane that is parallel to the code carrier and situated further away from the code carrier in comparison with the front side such that its overhang is less than its height,
    wherein a smaller value can be chosen for the distance, compared with an apparatus in which the measuring components are arranged on a plane defined by the front side,
    wherein:
        in the surface of a rear side of the carrier element, said rear side facing away from the code carrier, a depression is provided, which has an opening to the front side of the carrier element,
        the radiation source is fitted in the depression, and
        the radiation source and the opening are aligned with one another in such a way that optical radiation from the radiation source can be emitted through the opening onto the code carrier, wherein the opening serves as a diaphragm.

2. The optoelectronic position measuring apparatus according to claim 1, wherein the overhang of the measuring components in each case has a positive value, has a negative value or is equal to zero.

3. The optoelectronic position measuring apparatus according to claim 1, wherein the radiation source and/or the detection element are/is arranged on the carrier element in a respective depression.

4. The optoelectronic position measuring apparatus according to claim 1, wherein the radiation source and/or the detection element on the carrier element with their/its end side do(es) not project beyond the front side of the carrier element in the direction of the code carrier.

5. The optoelectronic position measuring apparatus according to claim 1, wherein the radiation source and/or the detection element are/is constructed on the carrier element without a housing, in a manner free of covering glass, and/or have/has a copper layer.

6. The optoelectronic position measuring apparatus according to claim 1, wherein the radiation source and the detection element are arranged on the carrier element respectively on a plane situated further away from the code carrier than the front side of the carrier element.

7. The optoelectronic position measuring apparatus according to claim 1, wherein
    the depression is closed toward the rear side by means of a closure,
    a part of the carrier element that is situated between the depression and the front side is made opaque, and/or
    the opening is filled wholly or partly with an optical filling adhesive which has either
        a planar surface that forms a planar area with the front side of the carrier element, or an optical diffractive or refractive surface at the front side of the carrier element.

8. The optoelectronic position measuring apparatus according to claim 1, wherein
the depression is filled wholly or partly with an optical filling adhesive, which has a planar surface that forms a planar area with the front side of the carrier element, or
has an optical diffractive or refractive surface at the front side of the carrier element.

9. The optoelectronic position measuring apparatus according to claim 1, wherein
the code carrier is configured as a circular disc,
is rotatable about an axis, wherein an angle of rotation about the axis can be detected by the detection element, and/or
has beam deflection means in the form of mirrors and/or waveguides, in order to direct the radiation emitted by the radiation source onto the detection element by reflection.

10. The optoelectronic position measuring apparatus according to claim 1, wherein the radiation source is configured as an LED or a laser diode.

11. The optoelectronic position measuring apparatus according to claim 1, wherein the detection element is configured as a sensor array.

12. The optoelectronic position measuring apparatus according to claim 1, wherein
the carrier element is assembled from a plurality of layers.

13. The optoelectronic position measuring apparatus according to claim 1, wherein the position code is fitted substantially over the whole area on that side of the code carrier which faces the carrier element.

14. A method for producing an optoelectronic position measuring apparatus, wherein the optoelectronic position measuring apparatus comprises:
a code carrier, which carries an optically detectable position code,
a radiation source for emitting optical radiation onto the code carrier,
a detection element having a multiplicity of light-sensitive receiving regions for receiving at least part of the optical radiation, as a result of which a scanning signal dependent on the position code can be generated and a position of the code carrier relative to the detection element can thus be detected,
wherein
the radiation source and the detection element are arranged on a printed circuit board in a fixed spatial relationship with respect to one another and in each case with an end side facing the code carrier,
the code carrier is arranged parallel to the front side of the carrier element, directly opposite to the radiation source and to the detection element, and movable with one degree of freedom, and
the code carrier and the carrier element are arranged at a fixed spatial distance with respect to one another and in such a way that throughout operation of the optoelectronic position measuring apparatus the radiation source and the detection element face the code carrier with the end side,
wherein the method comprises:
producing a depression on the rear side of the printed circuit board,
producing an opening between the depression and the front side, and
arranging the radiation source in the depression, such that optical radiation from the radiation source can be emitted through the opening onto the code carrier, wherein the opening serves as a diaphragm.

15. The method for producing an optoelectronic position measuring apparatus according to claim 14, further comprising closing the depression at the rear side, wherein the radiation source is fitted to a closure, by means of which the depression is closed.

16. The method for producing an optoelectronic position measuring apparatus according to claim 14, wherein application of an opaque layer on a part of the printed circuit board that is situated between the depression and the front side.

17. The method for producing an optoelectronic position measuring apparatus according to claims 14, further comprising:
at least partially filling the opening with an optical filling adhesive, wherein the optical filling adhesive,
has a planar surface that forms a planar area with the front side of the printed circuit board, or
has an optical diffractive or refractive surface at the front side of the printed circuit board.

18. An optoelectronic position measuring apparatus, comprising
a code carrier, which carries an optically detectable position code,
a radiation source for emitting optical radiation onto the code carrier and
a detection element having a multiplicity of light-sensitive receiving regions for receiving at least part of the optical radiation, as a result of which a scanning signal dependent on the position code can be generated and a position of the code carrier relative to the detection element can thus be detected, wherein
the measuring components radiation source and detection element are arranged on a carrier element in a fixed spatial relationship with respect to one another and in each case with an end side facing the code carrier, in each case have a height between the end side and a base, and in each case have an overhang between the end side and a front side of the carrier element, said front side facing the code carrier,
the carrier element is a printed circuit board,
the code carrier is arranged parallel to the front side of the carrier element, directly opposite to the radiation source and to the detection element, and movable with one degree of freedom, and
the code carrier and the carrier element are arranged at a fixed spatial distance with respect to one another, the distance being at least of the same magnitude as the overhang of the radiation source, and being at least of the same magnitude as the overhang of the detection element,
wherein at least that measuring component having the greater height is arranged on a plane that is parallel to the code carrier and situated further away from the code carrier in comparison with the front side such that its overhang is less than its height,
wherein a smaller value can be chosen for the distance, compared with an apparatus in which the measuring components are arranged on a plane defined by the front side,
wherein the detection element is fitted in a depression on the front side of the carrier element, wherein
the detection element forms a planar area with the side of the carrier element facing the code carrier, or an optical component fitted in front of the detection element in the depression forms a planar area with the front side of the carrier element.

19. An optoelectronic position measuring apparatus, comprising
a code carrier, which carries an optically detectable position code,
a radiation source for emitting optical radiation onto the code carrier and
a detection element having a multiplicity of light-sensitive receiving regions for receiving at least part of the optical radiation, as a result of which a scanning signal dependent on the position code can be generated and a position of the code carrier relative to the detection element can thus be detected, wherein
the measuring components radiation source and detection element are arranged on a carrier element in a fixed spatial relationship with respect to one another and in each case with an end side facing the code carrier, in each case have a height between the end side and a base, and in each case have an overhang between the end side and a front side of the carrier element, said front side facing the code carrier,
the carrier element is a printed circuit board,
the code carrier is arranged parallel to the front side of the carrier element, directly opposite to the radiation source and to the detection element, and movable with one degree of freedom, and
the code carrier and the carrier element are arranged at a fixed spatial distance with respect to one another, the distance being at least of the same magnitude as the overhang of the radiation source, and being at least of the same magnitude as the overhang of the detection element,
wherein at least that measuring component having the greater height is arranged on a plane that is parallel to the code carrier and situated further away from the code carrier in comparison with the front side such that its overhang is less than its height,
wherein a smaller value can be chosen for the distance, compared with an apparatus in which the measuring components are arranged on a plane defined by the front side,
wherein the radiation source is fitted in a depression on the front side of the carrier element,
wherein the depression has a via hole and/or an adhesive trap.

* * * * *